(12) United States Patent
Li (10) Patent No.: US 6,671,623 B1
(45) Date of Patent: Dec. 30, 2003

(54) METHODS AND SYSTEM FOR CHARACTERIZING THE RESPONSE OF SUBSURFACE MEASUREMENTS TO DETERMINE WELLBORE AND FORMATION CHARACTERISTICS

(75) Inventor: Qiming Li, Sugar Land, TX (US)

(73) Assignee: Schlumberger Technology Corporation, Suger Land, TX (US)

( * ) Notice: Subject to any disclaimer, the term of this patent is extended or adjusted under 35 U.S.C. 154(b) by 562 days.

(21) Appl. No.: 09/619,570

(22) Filed: Jul. 19, 2000

Related U.S. Application Data (60) Provisional application No. 60/159,728, filed on Oct. 15, 1999.

(51) Int. Cl.$^7$ ............................................. G01V 3/18
(52) U.S. Cl. ................................... 702/7; 324/338
(58) Field of Search .................. 702/6, 7, 11; 324/338, 324/339, 303; 367/73; 703/10, 6

(56) References Cited

U.S. PATENT DOCUMENTS

| | | | |
|---|---|---|---|
| 4,407,157 A | 10/1983 | Lichtenberg | |
| 4,752,882 A | 6/1988 | Givens | |
| 4,791,797 A | 12/1988 | Paske et al. | |
| 5,339,036 A | 8/1994 | Clark et al. | |
| 5,397,893 A | 3/1995 | Minette | |
| 5,469,736 A | 11/1995 | Moake | |
| 5,886,303 A | 3/1999 | Rodney | |

OTHER PUBLICATIONS

Lin, Y et al., *Inversion of Induction Logging Data Using the Least Square Technique*, SPWLA Twenty–Fifth Annual Logging Symposium, 1984, pp. 1–14.

Mezzaesta, A. et al., *Integrated 3–D Interpretation of Resistivity Logging Measurement by Inversion Methods*, SPWLA Thirty–Sixth Annual Logging Symposium, 1995, pp. 1–8.

Bonner, et al., *A New Generation of Electrode Resistivity Measurements for Formation While Drilling*, SPWLA Thirty–Fifth Annual Logging Symposium, Jun. 1994, pp. 1–9.

Combined Search and Examination Report Under Sections 17 and 18(3), Jan. 12, 2001, The Patent Office, United Kingdom.

*Primary Examiner*—Donald E. McElheny, Jr.
(74) *Attorney, Agent, or Firm*—Victor H. Segura (57) ABSTRACT

Methods and systems are disclosed for characterizing the response of a subsurface resistivity measurement to determine a characteristic of a borehole within the subsurface and/or a characteristic of a formation surrounding the borehole. Generally the methods include obtaining subsurface resistivity measurement data with a well tool disposed within the borehole and fitting the obtained resistivity measurement data to an equivalent electric circuit model to determine the borehole and/or formation characteristic. The circuit model of these embodiments is representative of a response of the well tool to borehole and formation parameters. The systems generally include a well tool and an apparatus adapted to be coupled to the well tool. The apparatus includes means for receiving measurement data generated by the well tool, means for storing model parameters representative of a response of the well tool to borehole and formation properties, and means for comparing the received measurement data to the stored model parameters to determine the borehole and/or formation characteristic. The disclosed equivalent circuit model is characterized by an electric circuit having at least one resistor-in-parallel component.

38 Claims, 12 Drawing Sheets

---

OBTAIN SUBSURFACE RESISTIVITY MEASUREMENT DATA WITH A WELL TOOL DISPOSED IN THE BOREHOLE — 300

FIT THE OBTAINED MEASUREMENT DATA TO A CIRCUIT MODEL TO DETERMINE THE BOREHOLE / FORMATION CHARACTERISTIC, THE MODEL REPRESENTATIVE OF A WELL TOOL RESPONSE TO BOREHOLE AND FORMATION PARAMETERS AND INCLUDING A RESISTOR-IN-PARALLEL COMPONENT — 310

METHODS AND SYSTEM FOR CHARACTERIZING THE RESPONSE OF SUBSURFACE MEASUREMENTS TO DETERMINE WELLBORE AND FORMATION CHARACTERISTICS

CROSS REFERENCES

This present application claims the benefit of U.S. Provisional Application No. 60/159,728 filed Oct. 15, 1999.

1. BACKGROUND OF THE INVENTION

1.1 Field of the Invention

This invention relates generally to a method and system for characterizing subsurface electromagnetic (EM) measurements to determine wellbore and formation properties and, more particularly, to a technique for obtaining the caliper of a wellbore and the electric and geometric properties of the surrounding rock formations from subsurface EM measurements. The invention has general application in the well logging art, but is particularly useful in measuring-while-drilling.

1.2 Description of Related Art

In order to improve oil and gas drilling operations, it is necessary to gather as much information as possible on the properties of the subsurface earth formation where deposits are believed to exist. Such properties include the resistivity of the earth formations traversed by the well borehole, in addition to data on the properties and configuration of the borehole itself.

The collection of downhole information, also referred to as logging, is realized in different ways. A well tool, comprising transmitting and sensing devices for measuring various properties, can be lowered into the borehole on the end of a cable, or wireline. With this type of wireline logging, borehole and formation parameters are measured as a function of depth, i.e., while the tool is being pulled uphole. An alternative to wireline logging techniques is the collection of data on downhole conditions during the drilling process. By collecting and processing such information during the drilling process, the driller can modify or correct key steps of the operation to optimize performance. While-drilling measurements are also less affected by significant hole washout and invasion, which typically occur at the wireline stage.

Schemes for collecting data of downhole conditions and movement of the drilling assembly during the drilling operation are known as measurement-while-drilling (MWD) techniques. Similar techniques focusing more on measurement of formation parameters than on movement of the drilling assembly are know as logging-while-drilling (LWD). However, the terms MWD and LWD are often used interchangeably, and the use of either term herein should be understood to include both the collection of formation and borehole information, as well as data on movement of the drilling assembly.

The processes often employed to measure the subsurface characteristics are subject to significant errors unless information on the borehole size, the borehole configuration, and the electric and geometric properties of the invaded zone are also taken into account. During the drilling process, mud filtrate penetrates into the virgin formation, creating an invaded zone. Knowledge of the borehole diameter, also known as the caliper, is essential to correct measurements that are sensitive to standoff. Monitoring the hole size can also be critical for the successful drilling and completion of a well when hole stability is of concern.

There is a lack of a reliable fullbore caliper measurement while drilling. Wireline caliper measurements may not be an option when critical decisions need to be made while drilling. Furthermore, hole conditions will likely have changed by the time a wireline caliper is run. In highly deviated and horizontal wells, both standoff (distance between the tool and borehole wall) and invasion are azimuthally varying. Interpreting measurement logs that are sensitive to standoff may require the knowledge of standoff at different directions. Thus, a fullbore caliper is extremely useful for interpreting azimuthal measurements.

U.S. Pat. No. 4,407,157 describes a technique for measuring a borehole caliper by incorporating a mechanical apparatus with extending contact arms that are forced against the sidewall of the borehole. Such mechanical apparatus have practical limitations and are limited in the range of diameter measurement they provide. Due to the unsuitability of mechanical calipers to drilling operations, indirect techniques of determining borehole calipers have been proposed.

Conventional caliper measurement techniques include acoustic transducers that transmit ultrasonic signals to the borehole wall. U.S. Pat. No. 5,469,736 describes an apparatus for measuring the caliper of a borehole by transmitting ultrasonic signals during a drilling operation. U.S. Pat. No. 5,397,893 describes a method for analyzing formation data from a MWD tool incorporating an acoustic caliper. U.S. Pat. No. 5,886,303 describes a logging tool including an acoustic transmitter for obtaining the borehole caliper while drilling. However, the techniques proposed with acoustic calipers entail measurements employing standoff and travel time calculations, resulting in data of limited accuracy. Sound wave reflections in soft formations may also be too weak to be accurately detected, leading to loss of signals.

U.S. Pat. No. 4,791,797 proposes another technique for measuring a borehole caliper while drilling. The '797 patent describes a process whereby two tools having different sensitivities are used to take downhole measurements. The obtained measurements are then combined in an iterative process to determine the borehole readings. In addition to requiring combined multiple computations and iterations, the techniques proposed by the '797 patent also require independent lithology identification.

Downhole measurements are also affected by mud filtrate invasion that changes the properties of the rock near the wellbore. The traditional approach in invasion analysis, based on plotted curves known as "tornado charts," requires the input data to be corrected for the effects of the borehole on the measurements. This is typically done, most of the time unjustified, assuming the hole size to be the same as the bit size of the drilling tool, since the actual hole size is rarely measured while drilling. Moreover, with more than three subsurface measurements, reading from the tornado charts produces results that depend on which three resistivities are taken as inputs.

The wealth of information provided by conventional multisensor and LWD tools makes these tools ideal for accurate borehole and formation definition through inversion to improve oil, gas, and water exploration. Inversion algorithms typically implement a forward modeling capability that can predict the well tool response for a given formation. See Lin, Y. et al., *Inversion of induction logging data using the least square technique*, SPWLA Twenty-Fifth Annual Logging Symposium, 1984; Mezzaesta, A. et al., *Integrated 2-D interpretation of resistivity logging measurement by inversion methods*, SPWLA Thirty-Sixth Annual Logging Symposium, 1995. However, accurate characterization of the tool response usually requires sophisticated and computer intensive numerical forward modeling codes to solve the fundamental equations governing the electromagnetic energy distribution of the measurements. The speed of current two-dimensional (2D) inversion programs is a major limitation preventing their universal application.

On the other hand, a physical concept that describes laterolog-type well tool responses to invasion has been used for many years. This is the pseudo-geometrical factor J, which is defined by the relation $$R_a = J R_{xo} + (1-J) R_t \tag{1}$$

where $R_a$ is the apparent formation resistivity of the measurement, $R_{xo}$ is the invaded zone resistivity, and $R_t$ is the actual resistivity of the virgin formation.

The pseudo-geometrical factor J is simply interpreted as the percentage of the measured signal coming from the invaded zone in the absence of a borehole. Obviously, J should depend on the invasion diameter $D_i$. Another deficiency of the pseudo-geometrical factor is that it not only depends on the invasion diameter but also on the contrast between $R_t$ and $R_{xo}$. This limits its utility for practical calculations since one has to tabulate all the values of J under different contrast and for different invasion diameters.

It is desirable to have a simplified method and system for characterizing the response of a subsurface EM measurement to accurately determine the fullbore electric caliper as well as the electric and geometric properties of the invaded zone and the virgin formation. It is also desirable to implement a fast inversion technique that can accurately reproduce the response of a well tool to borehole and formation parameters.

2. SUMMARY OF THE INVENTION

One aspect of the invention is a method for characterizing the response of a subsurface resistivity measurement to determine a characteristic of a borehole within the subsurface and/or a characteristic of a formation surrounding the borehole. The method includes obtaining subsurface resistivity measurement data with a well tool disposed within the borehole; and fitting the obtained resistivity measurement data to an electric circuit model to determine the borehole characteristic and/or the formation characteristic, the circuit model being representative of a response of the well tool to borehole and formation parameters, the model including at least one resistor-in-parallel component.

Another aspect of the invention is a method for determining a characteristic of a borehole traversing an earth formation and/or a characteristic of the formation surrounding the borehole using measurement data obtained from a well tool disposed within the borehole. The method includes reproducing a response of the well tool to borehole and formation parameters using an electric circuit model, the model being characterized by at least one resistor-in-parallel component; and fitting the obtained measurement data to the reproduced response to determine the borehole characteristic and/or the formation characteristic.

Another aspect of the invention is a system for characterizing the response of a subsurface resistivity measurement to determine a characteristic of a borehole within the subsurface and/or a characteristic of a formation surrounding the borehole, the system including a well tool and an apparatus adapted to be coupled to the well tool, the tool being adapted to transmit and receive electromagnetic energy when disposed in the borehole, the apparatus being adapted to respond to measurement data generated by the tool and associated with the electromagnetic energy. The apparatus includes means for receiving the measurement data; means for storing model parameters representative of a response of the well tool to borehole and formation properties, the model being characterized by an electric circuit having at least one resistor-in-parallel component; and means for comparing the received measurement data to the stored model parameters to determine the borehole characteristic and/or the formation characteristic.

Another aspect of the invention is a system for determining a characteristic of a borehole traversing an earth formation and/or a characteristic of the formation surrounding the borehole, the system including a well tool and an apparatus adapted to be coupled to the well tool, the tool being adapted to transmit and receive electromagnetic energy through the borehole and the formation when disposed in the borehole, the apparatus being adapted to respond to measurement data generated by the tool and associated with the electromagnetic energy. The apparatus includes means for receiving the measurement data; means for storing model parameters representative of a response of the well tool to borehole and formation properties, the model being characterized by an electric circuit having at least one resistor-in-parallel component; and means for comparing the received measurement data to the stored model parameters to determine the borehole characteristic and/or the formation characteristic.

3. BRIEF DESCRIPTION OF THE DRAWINGS

Other aspects and advantages of the invention will become apparent upon reading the following detailed description and upon reference to the drawings in which.

4. DESCRIPTION OF ILLUSTRATIVE EMBODIMENTS

Figure 1:
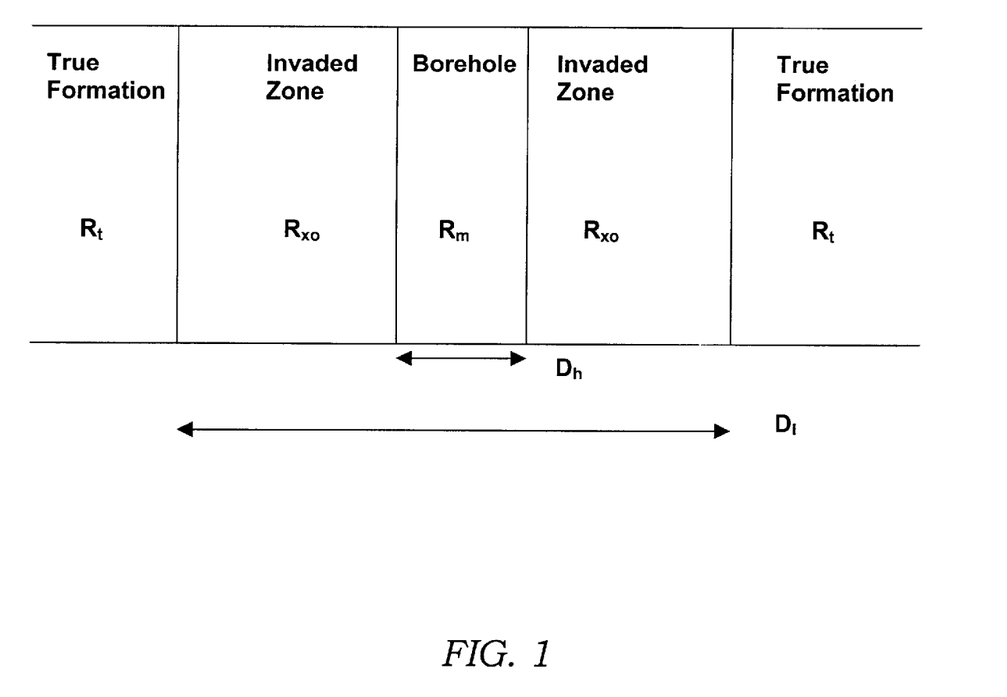
FIG. 1 illustrates an idealized wellbore environment displaying a step invasion profile.

FIG. 1 illustrates the environment encountered during subsurface measurement with conventional well tools. For simplicity, an idealized step invasion profile is assumed. The relevant parameters of the formation model consist of two geometrical parameters, the borehole diameter $D_h$, the invasion diameter $D_i$, and three resistivity parameters, mud resistivity $R_m$, invasion resistivity $R_{xo}$, and formation resistivity $R_t$. For focused measurements, it is clear that measurement current has to go through the borehole and invaded zone before entering the undisturbed formation. Thus, the resistivity measurement will be affected by the electrical properties of all these zones.

Figure 2:
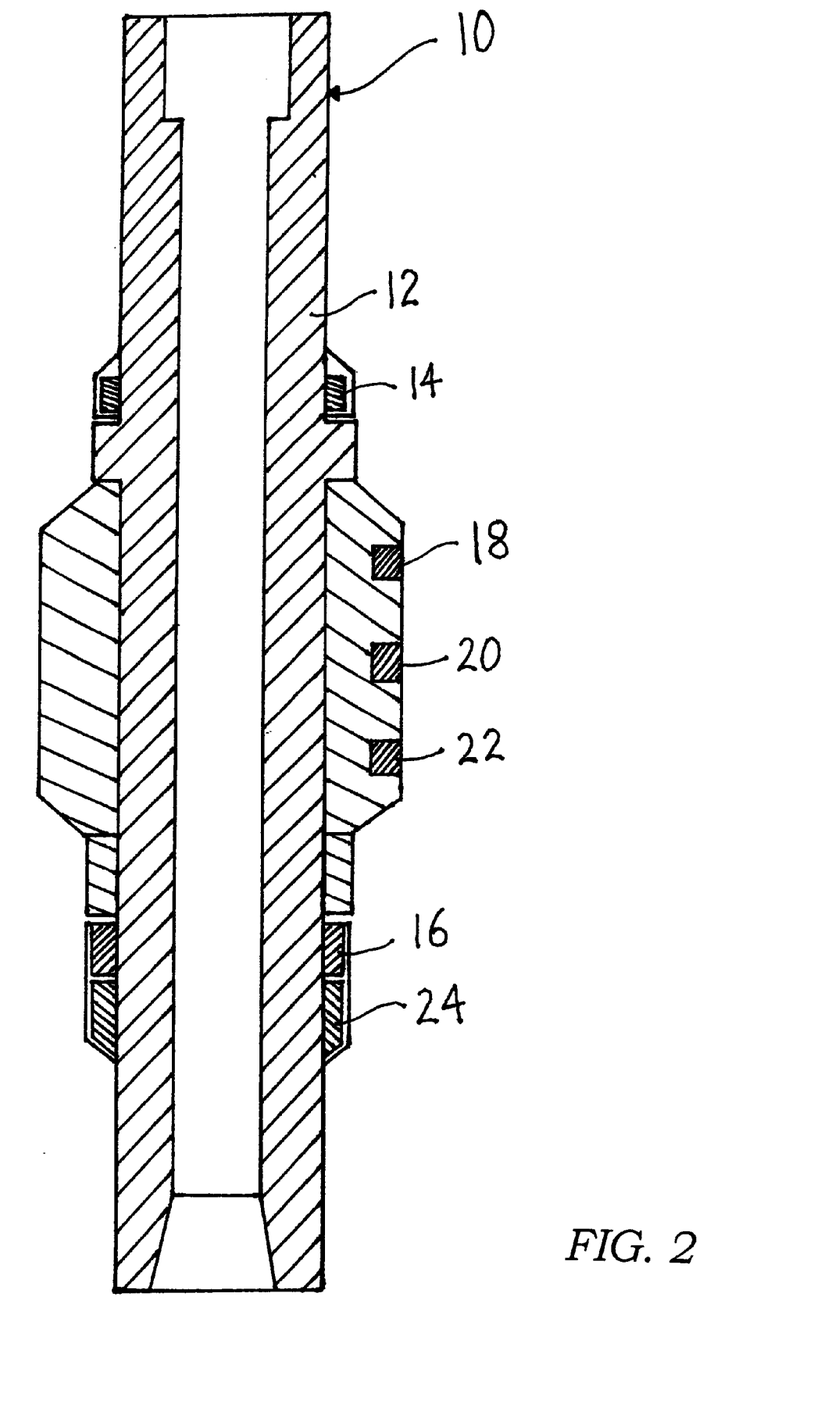
FIG. 2 is a cross-sectional view of a laterolog well tool embodiment suitable for use with the present invention.

An embodiment of the invention utilizes multi-sensor azimuthal electric measurements to calculate caliper in different sectors of azimuthal directions and, at the same time, determine the properties of the true rock formation surrounding the borehole. An LWD instrument particularly suited for use with this invention is described in U.S. Pat. No. 5,339,036 issued to Clark et al. (Clark '036), incorporated herein by reference. FIG. 2 is representative of one such LWD instrument. As seen in FIG. 2, one embodiment of the tool 10 includes a section of tubular drill collar 12 having mounted thereon a transmitter antenna 14, a receiving antenna 16, receiving button sensors 18, 20, 22 and a ring sensor 24. [In the present disclosure, any reference to a sensor is intended to encompass an electrode, and vice-versa.] These instruments are representative of conventional laterolog well tools.

Figure 3:
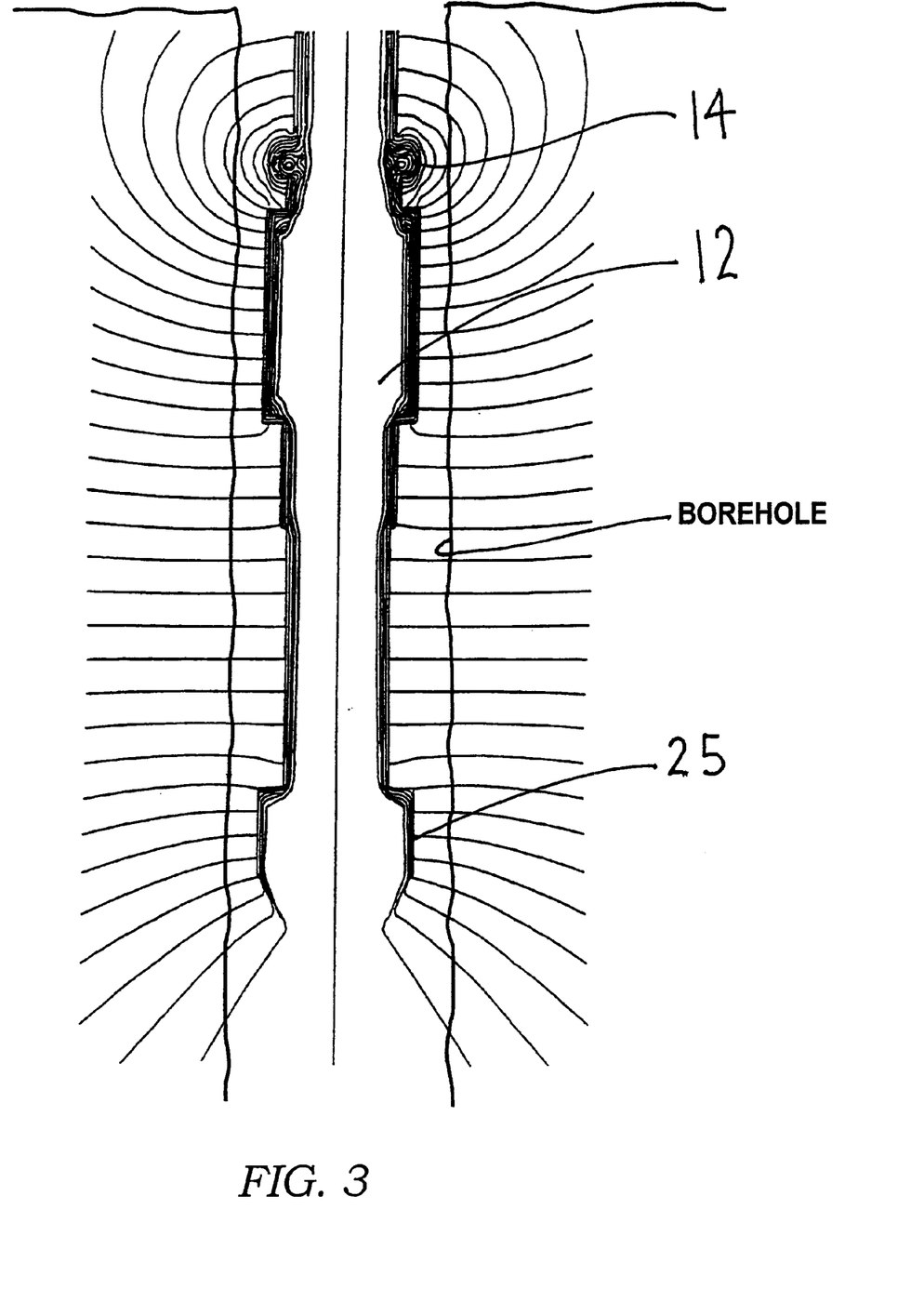
FIG. 3 is a representation of the type of current pattern obtained with the tool embodiment of FIG. 2 when the transmitting coil is energized.

With the tool 10 disposed in the borehole, the transmitter coil 14 induces a voltage on the drill collar 12, causing a current to flow through the surrounding formation. FIG. 3 illustrates a general representation of the known type of current pattern that results from energizing the transmitter coil 14 in a well being drilled with mud having substantial conductivity. The pattern will, of course, depend on the formations' bed patterns and conductivities; the example in FIG. 3 represents the simplified case of uniform conductivity. The generated current travels in a path that includes the drill bit 25 (coupled to the drill collar 12) and earth formations around the drill bit 25. The sensors 18, 20, 22, 24 provide multiple resistivity measurements, containing different azimuthal contributions from the current conduction through the formation and borehole fluid. See S. Bonner et al., *A New Generation of Electrode Resistivity Measurements for Formation Evaluation While Drilling*, SPWLA Thirty-Fifth Annual Logging Symposium, June 1994.

4.1 Equivalent Circuit Model

In the pseudo-geometrical factor J description, the apparent resistivity is written as the sum of the contributions from the two formation zones (Eq. 1). Although J is called a geometrical factor, meaning that it should only be a function of geometry, it is nevertheless dependent on geometry and resistivity values. A closer examination of the pseudo-geometrical factor J of Equation (1) reveals that a current component that passes vertically through the invaded zone has been neglected. The contribution from this component becomes dominant in the presence of a high resistivity contrast between the invaded zone and undisturbed formation. There is also a current component that passes vertically through the mud in the borehole that needs to be accounted for. These current components may be represented by a resistor-in-parallel component in an equivalent electric circuit model as described below.

Figure 4:
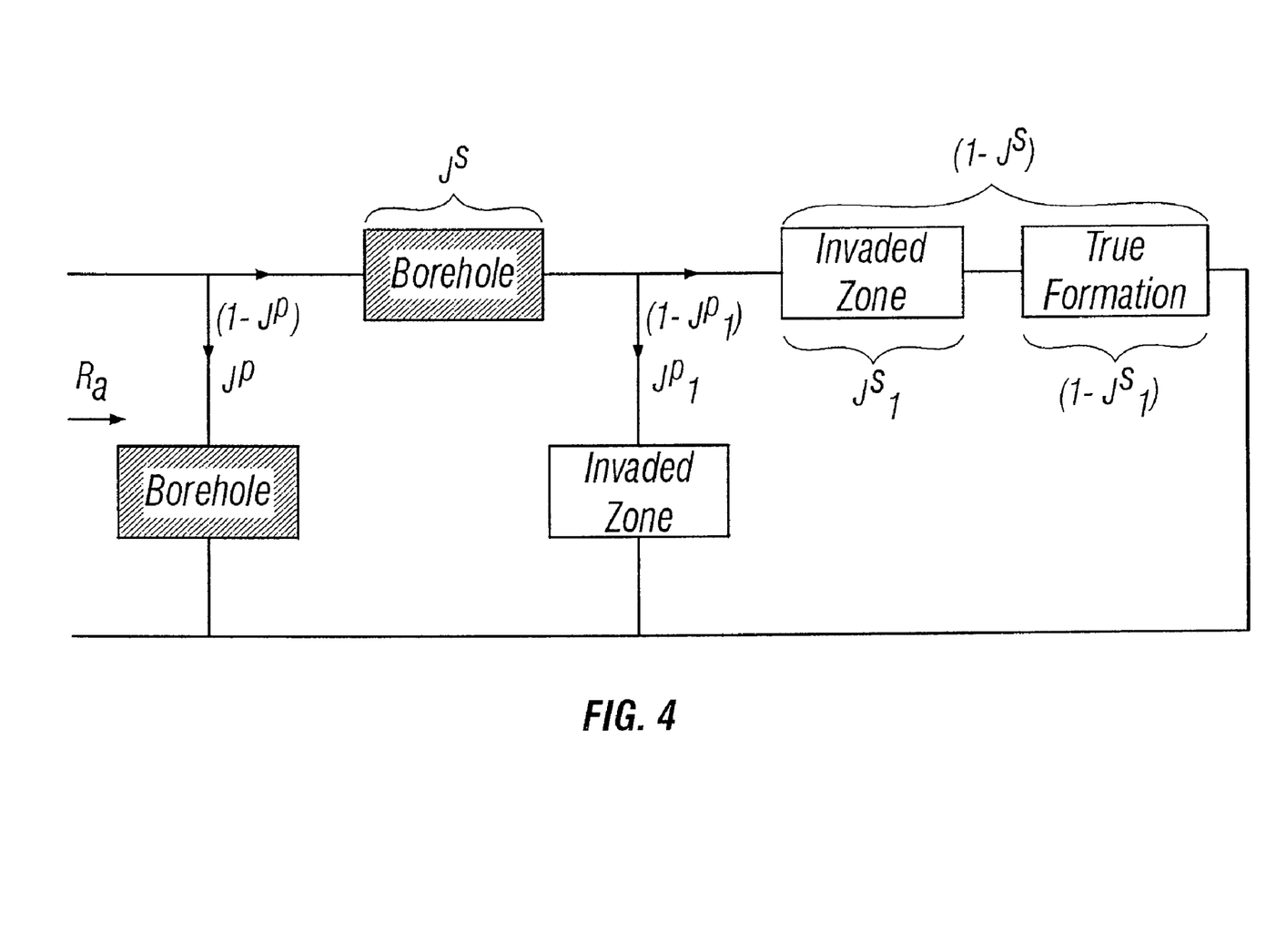
FIG. 4 is a schematic diagram of an equivalent circuit model that is used to characterize the response of a subsurface measurement in accord with the invention.

Turning to FIG. 4, a representation of the overall tool 10 response to the borehole mud and mud-filtrate invasion is constructed in the form of an equivalent electric circuit model. $J^S$ and $J^S_1$ are the geometrical factors analogous to the conventional pseudo-geometrical factor and represent the weighting factor of the voltage drop in the borehole and the invaded zone, respectively. $J^P$ and $J^P_1$ are new geometrical factors representing the weighting factor of the vertical current through the borehole and the invaded zone, respectively.

The apparent formation resistivity $R_a$ from the equivalent electric circuit model of FIG. 4 is expressed as $$\frac{1}{R_a} = \frac{J^P}{R_m} + \frac{(1-J^P)}{J^S R_m + (1-J^S)R_{\textit{eff}}}, \quad (2)$$

where $$\frac{1}{R_{\textit{eff}}} = \frac{J^P_1}{R_{xo}} + \frac{(1-J^P_1)}{J^S_1 R_{xo} + (1-J^S_1)R_t}. \quad (3)$$

The values of the geometrical factors $J^S$, $J^P$, $J^S_1$ and $J^P_1$ are obtained by comparing or fitting the equivalent circuit expression of Equation (2) to a tool response derived from numerical modeling techniques as known in the art. For example, a two-dimensional (2D) finite-element method may be employed, taking into account both the detailed shape of the particular well tool and the frequency of the measurement. Borehole fluid or mud resistivity $R_m$ can be determined by taking a mud sample at the surface or measured downhole with suitable sensor means. Alternatively, the equivalent circuit model may be extended to solve for $R_m$, provided a channel is shallow enough to have substantial weight from the borehole.

$J^S(D_h)$ and $J^P(D_h)$ describe the tool response to borehole mud, depending only on the borehole diameter $D_h$. $J^S_1(D_h, D_i)$ and $J^P_1(D_h, D_i)$ describe the tool response to mud filtrate invasion, depending only on $D_h$ and invasion diameter $D_i$. $R_{eff}$ can be interpreted as a combined effective formation resistivity of the invaded and the virgin formation seen by the tool inside the borehole.

In the model, the tool is assumed to be centered in a circular borehole with a step invasion profile, as depicted in FIG. 1. The bed is assumed thick so shoulder bed effects are neglected. The thick bed assumption here is much less restrictive than appears since the focused measurements provided by conventional LWD tools usually have good vertical responses.

Figure 5:
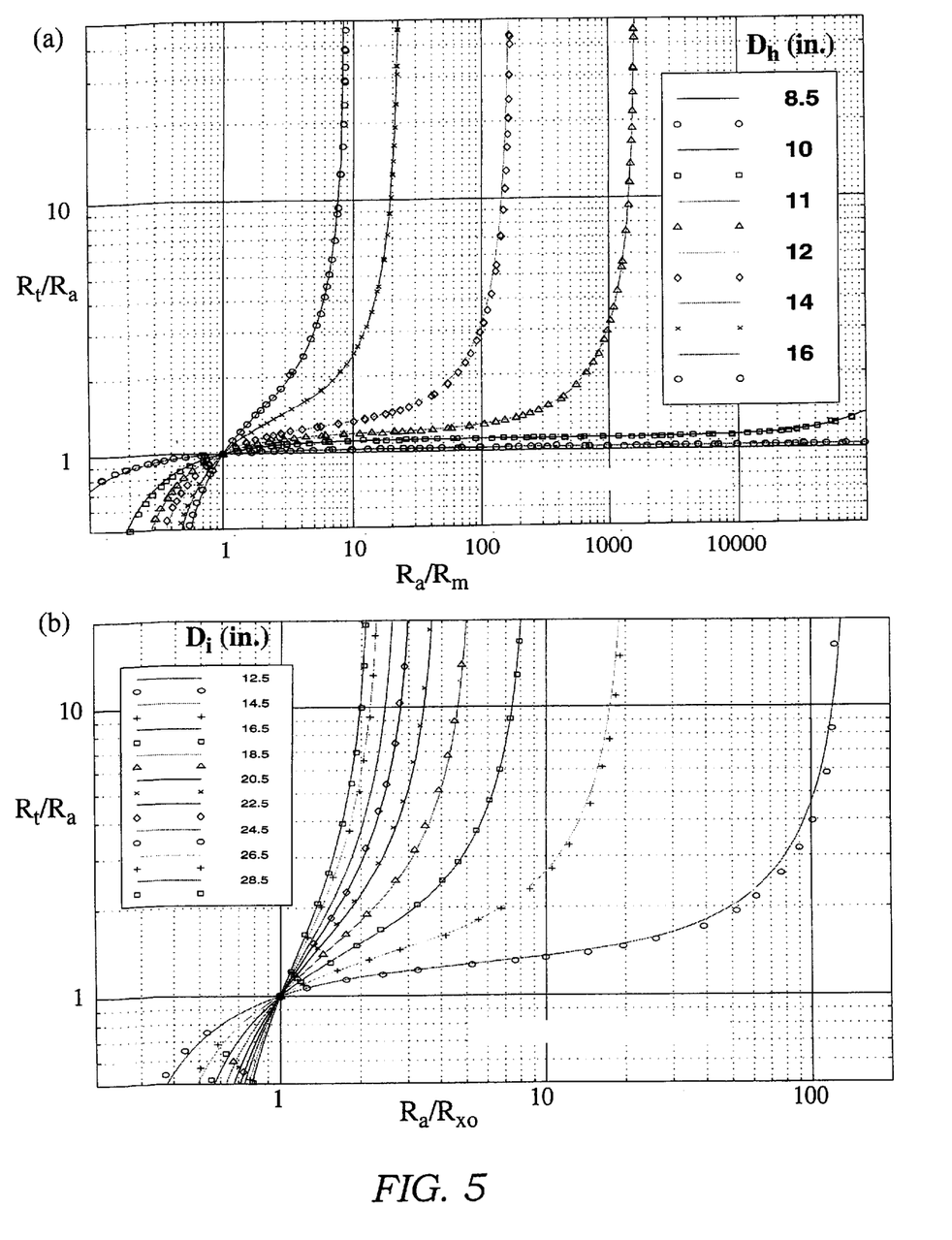
FIG. 5a is a crossplot of a fitting of calculated borehole responses to an expression of the equivalent circuit model of FIG. 4.
FIG. 5b is a crossplot of a fitting of calculated invasion responses to an expression of the equivalent circuit model of FIG. 4.

Once the various geometrical factors are obtained by fitting, the circuit model now possesses the capability of predicting the response of the tool within the step invasion model. The accuracy of the equivalent circuit model to describe the tool response can be judged from the accuracy of the fit to the 2D finite-element modeling. FIG. 5a shows a typical fit to the borehole response for the medium sensor 20 measurements at hole sizes of $D_h$=8.5, 10, 11, 12, 14, and 16 inches for the tool 10 of FIG. 2. The symbols are the original numerical data from the finite-element modeling and the lines are best fit to the form of Equation (2) with $R_{xo}=R_t$. Note that once the resistivity transform has been applied, the tool responses are functions of resistivity ratio only for low frequency laterolog-type measurements.

FIG. 5b shows a fit to invasion response for the medium sensor 20 for a set of invasion diameters $D_i$ from 12.5 inches to 28.5 inches and a fixed hole diameter $D_h$=8.5 inches. The mud resistivity $R_m$ is 0.2 ohm-meter. Similar fittings have been done for all the measurement channels and for many borehole and invasion diameters with generally excellent accuracy. However, the circuit model may not perform as well for resistive invasion, which is to be expected for laterolog measurements where the current flow patterns are adversely affected by the presence of radial resistive layers.

In the approach of the invention, the J factors are solely functions of geometry, independent of the mud resistivity $R_m$, flushed zone resistivity $R_{xo}$, and the formation resistivity $R_t$. Thus, for a fixed geometry, only four geometrical factors per measurement channel are applied to describe the tool sensor response to all values of $R_m$, $R_{xo}$, and $R_t$, resulting in significant simplification of the interpretation response to invasion and borehole effects.

Figure 6:
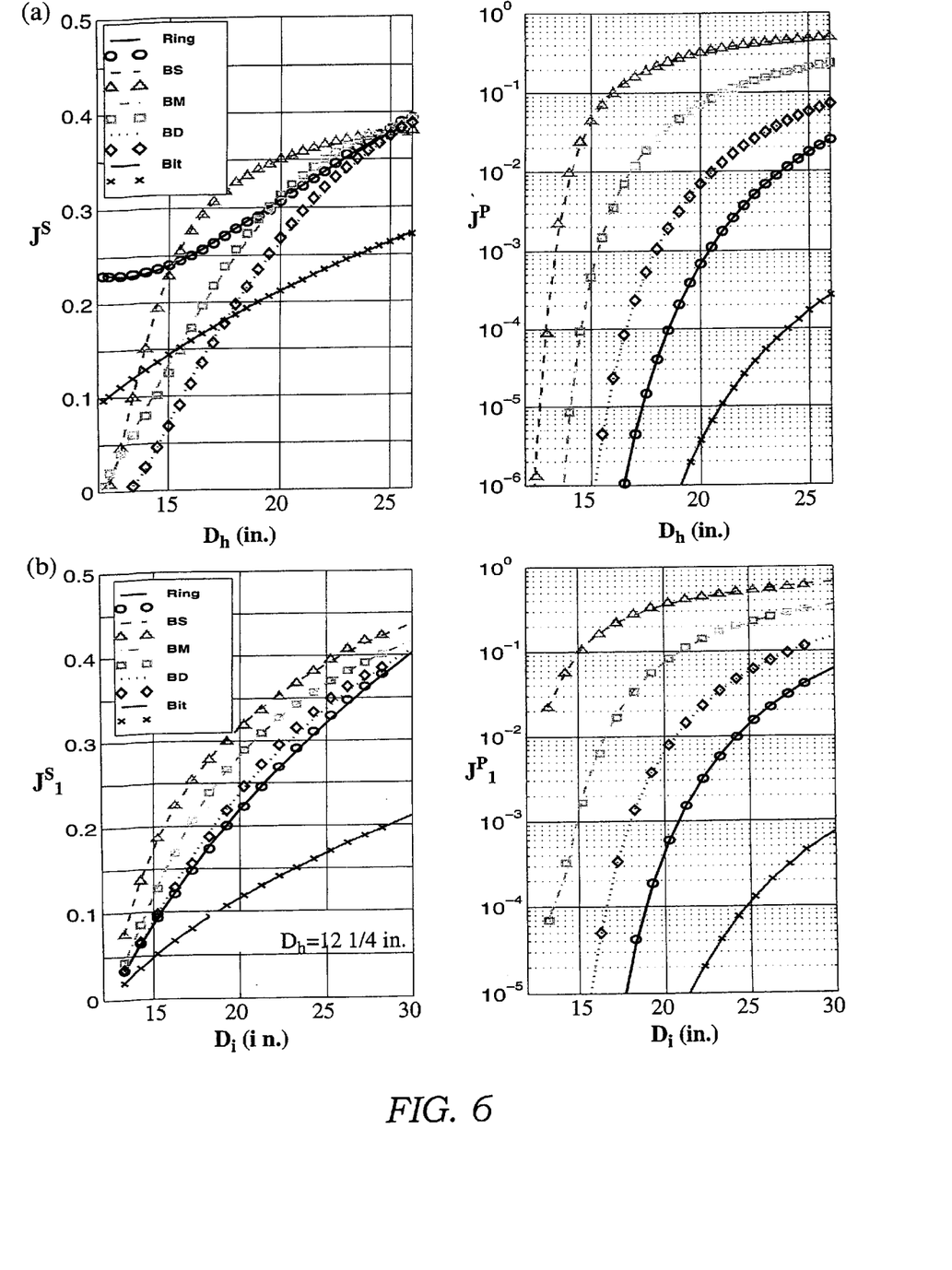
FIG. 6a shows crossplots of fittings of calculated geometrical factors as a function of borehole diameter in accord with the invention.
FIG. 6b shows crossplots of fittings of calculated geometrical factors as a function of invasion diameter for a fixed borehole diameter in accord with the invention.

Further reduction can be achieved by fitting $J^S_1(D_h)$, $J^P(D_h)$, $J^S_1(D_h, D_i)$, and $J^P_1(D_h, D_i)$ to a functional form. For example, an equation to fit the invasion geometrical factor $J^P(D_h, D_i)$ for a fixed borehole diameter is $$J^P(D_h, D_i) = e^{\left(a_0 + \frac{a_1}{D_i^\alpha} + \frac{a_2}{D_i^\beta}\right)}, \quad (4)$$

where the fitting parameters are $a_0$, $a_1$, $a_2$, $\alpha$ and $\beta$. Note that a new set of fitting parameters is obtained for each borehole size. Here, $D_i$ is the invasion depth (invasion radius–borehole radius). FIG. 6a shows the dependence of $J^S$ and $J^P$ on the hole size $D_h$ and the best fit to an exponential equation for the well tool 10 of FIG. 2.

FIG. 6b shows similar fittings for $J^S_1$ and $J^P_1$ as a function of $D_i$ for $D_h$=12.25 inches. $J^S_1$ and $J^P_1$ are also functions of borehole size, a manifestation of the strong coupling between borehole and invasion response for laterolog well tools. Note also that the geometrical factor $J^S$ (or $J^S_1$) here does not approach 1 for large borehole sizes because of the increasingly large contribution from terms containing $J^P$ (or $J^P_1$). These fittings have been done for different well tools for many hole sizes, with the resulting curves being quite smooth and displaying a good fit.

4.2 Inversion Examples

Figure 7:
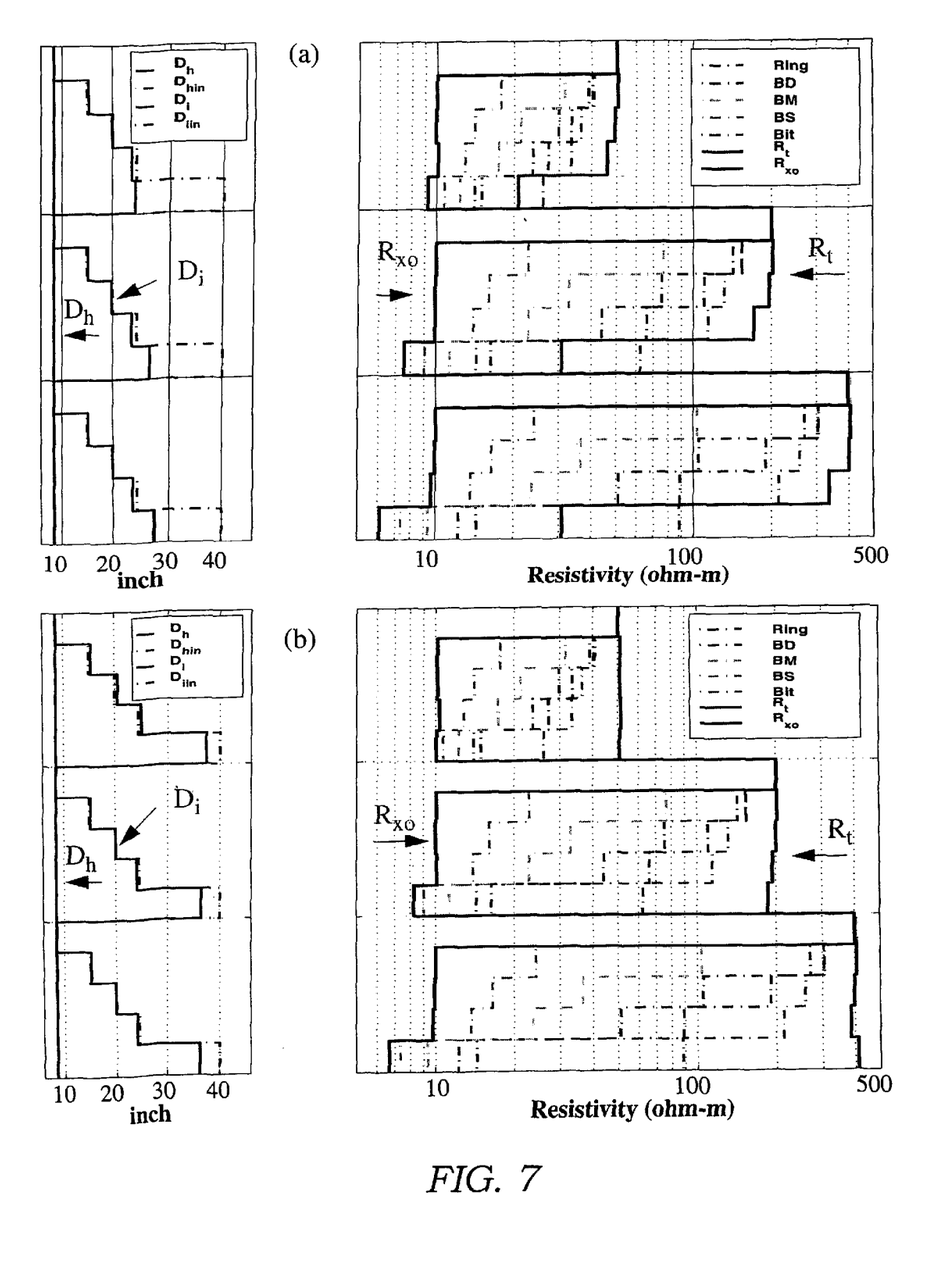
FIG. 7a graphically illustrates calculated borehole and formation characteristics obtained with application of the present invention.
FIG. 7b graphically illustrates calculated borehole and formation characteristics obtained with application of the present invention as in FIG. 7a with the addition of a bit resistivity parameter as an input.

The equivalent circuit model of the invention was verified with computed logs of the laterolog well tool disclosed in Clark '036. Apparent formation resistivities $R_a$ were computed using finite-element modeling and used as inputs for the circuit model. FIGS. 7a–b show the results of inversion with fixed $D_h$=8.5 inches, $R_m$=0.1 ohm-meter, and $R_{xo}$=10 ohm-meter, but several $R_t$ (50, 200 and 400 ohm-meter) and $D_i$ (8.5, 15, 20, 24.5 and 40 inches). Four resistivity values from the Ring, the Deep Button, the Medium Button and the Shallow Button are taken as input along with the mud resistivity. The inversion program produces a set of $D_h$, $D_i$, $R_{xo}$ and $R_t$ that can best reproduce the sensor response. The left track shows the input (dot-dashed) and inverted (solid) $D_i$ and $D_h$. The right track shows the modeled log (dashed) from the finite-element method and the inverted $R_t$ and $R_{xo}$, (solid).

Since the tool response is entirely parameterized as a function of physical parameters in the equivalent circuit model, a conjugated-gradient method may be employed to minimize the cost function in the inversion. Some continuity and $R_t$-bound constraints may be implemented to guide the solver to the physically more plausible solution. The conjugate-gradient method is a multidimensional minimization technique that yields fast convergence to a minimum when the functional form around the minimum is approximately quadratic. See Polak, E., 1971 *Computational Method in Optimization* (New York: Academic Press). Another advantage provided by this approach is that the Hassin matrix can be calculated, from which the statistical range of the inverted parameters can be estimated.

As described in Clark '036, the laterolog tool 10 of FIG. 2 provides a bit resistivity measurement. The bit resistivity was not used as an input for the inversion results shown in FIG. 7a. Without using the bit measurement, the circuit model obtained accurate $R_t$, $R_{xo}$, and $D_i$ for $D_i$ up to 25 inches. The accuracy degrades slightly with increasing $D_i$ and $R_t/R_{xo}$ contrast. The inclusion of the bit measurement, which is the deepest measurement provided by this particular tool, substantially improves the $R_t$ and $D_i$ estimates as shown in FIG. 7b. Note that the circuit model correctly reproduces the borehole even in the presence of invasion. The 1D equivalent circuit model treats borehole and invasion simultaneously, thus distinguishing borehole effect from invasion effect.

Figure 8:
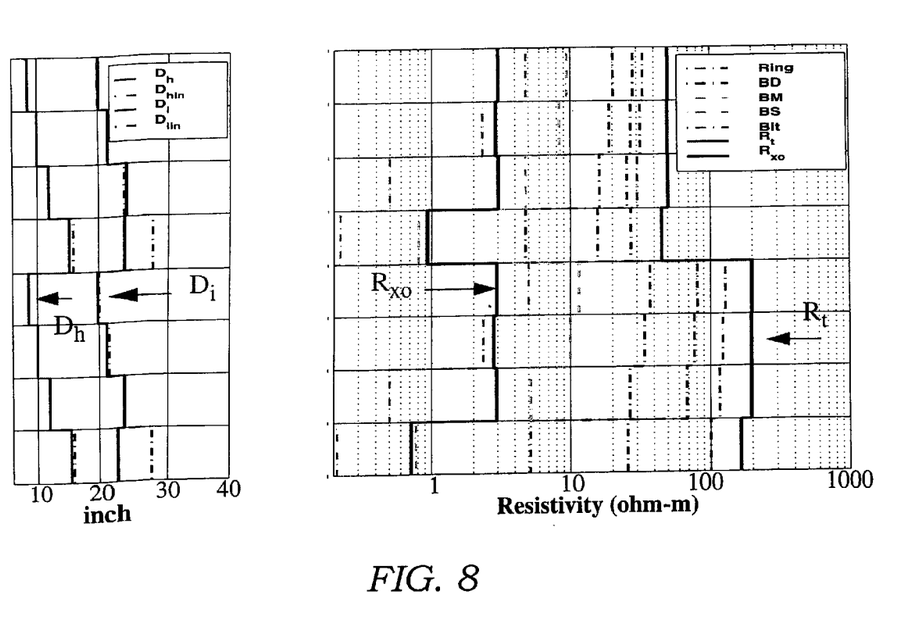
FIG. 8 graphically illustrates calculated borehole and formation characteristics obtained with application of the present invention for a case where the borehole is washed out and the formation is invaded.

FIG. 8 shows another test case for the response of the circuit model when the borehole is washed out and the formation is invaded. Again, the inputs were from finite-element modeling of the tool disclosed in Clark '036. The definition of the curves is the same as in FIGS. 7a–b. The bit measurement was used in this inversion. The circuit model produced the correct borehole and invasion diameters and invaded zone and true formation resistivities except for $D_h$=16 inches, when the invasion diameter from the model is much smaller than the correct value. The $R_{xo}$ value is also adversely affected. This results from inaccuracy in modeling for very large borehole sizes.

Figure 9:
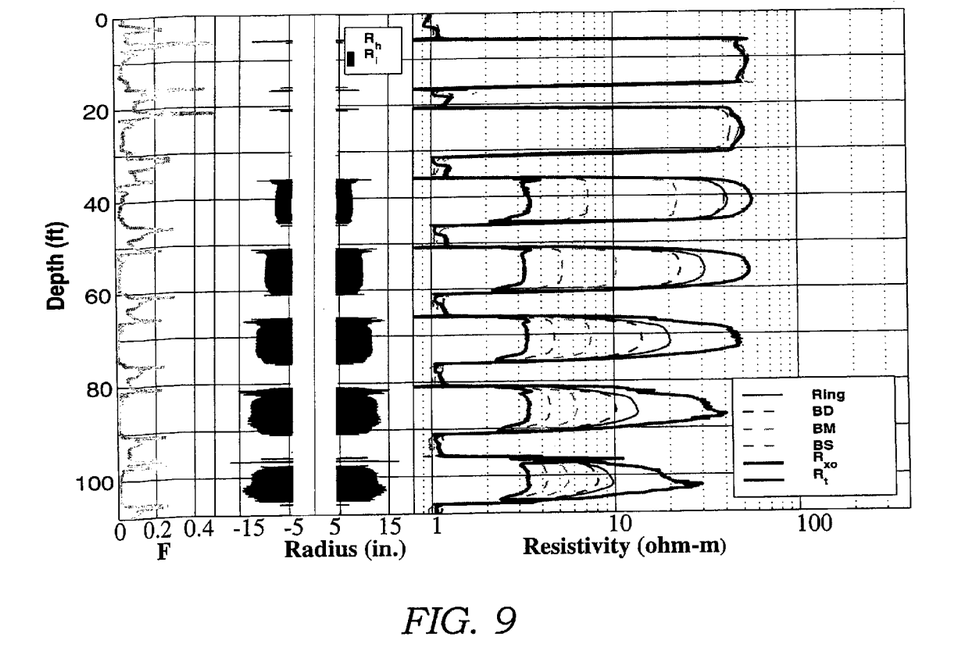
FIG. 9 graphically illustrates calculated borehole and formation characteristics obtained with application of the present invention for a case where sequential beds are drilled with different invasion parameters.

FIG. 9 shows the inversion result of another computed log when the tool is drilling through a sequence of beds with $R_t$=50 ohm-meter, $R_{xo}$=3 ohm-meter and different invasion parameters $D_i$=8.5, 10, 15, 20, 25, 30, and 40 inches from top to bottom. The borehole is 8.5 inches in diameter and filled with salty mud with $R_m$=0.05 ohm-meter. The shoulder beds are shale with resistivity $R_s$=1.0 ohm-meter. The ring 24 and three button 18, 20, 22 measurements and the mud resistivity $R_m$ are taken as inputs. The original log (borehole corrected assuming $D_h$=8.5 inches) along with the inverted $R_t$ and $R_{xo}$ are shown on the right track. The middle track shows the inverted borehole and invasion profile. The left track shows the value of the cost function associated with the set of inverted parameters. When invasion diameter is larger than 30 inches, the circuit model may not produce an accurate $R_t$ and $D_h$. Still, the inverted $R_t$ is much closer to the true rock formation resistivity than the ring 24 measurement. In this case, the circuit model also provides a reasonable estimate of the $R_{xo}$ values.

Figure 10:
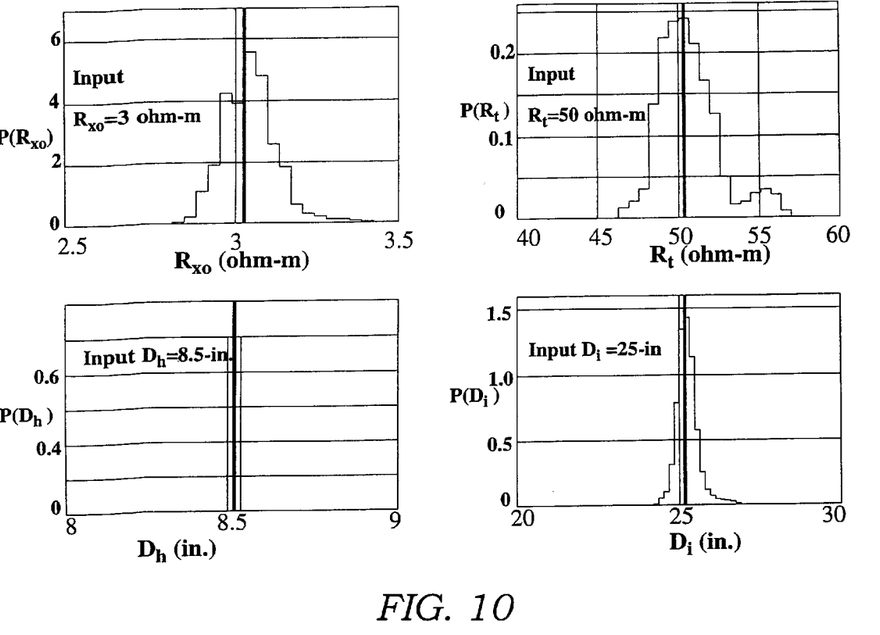
FIG. 10 shows crossplots of the distribution of borehole and formation characteristics obtained with application of the present invention when a percentage of random noise is added or subtracted from the input parameters.

The synthetic log examples described above assume no error in the input beside the difference between the finite-element modeling and the equivalent circuit model employed in the inversion. The presence of tool measurement error is likely to amplify the error in the inverted parameter. FIG. 10 shows the distribution of inverted circuit model parameters when a=+/−4% random noise error is independently added to each of the input resistivity channels. The input model parameters are $R_t$=50 ohm-meter, $R_{xo}$=3 ohm-meter, $D_h$=8.5 inches and $D_i$=25 inches. These distributions are obtained from 20,000 independent random samples. The mean of the distributions, shown as a thick vertical line, is very close to the correct input value. The amplification of errors depends on the values of the model parameter set.

4.3 Field-Log Examples

Figure 11:
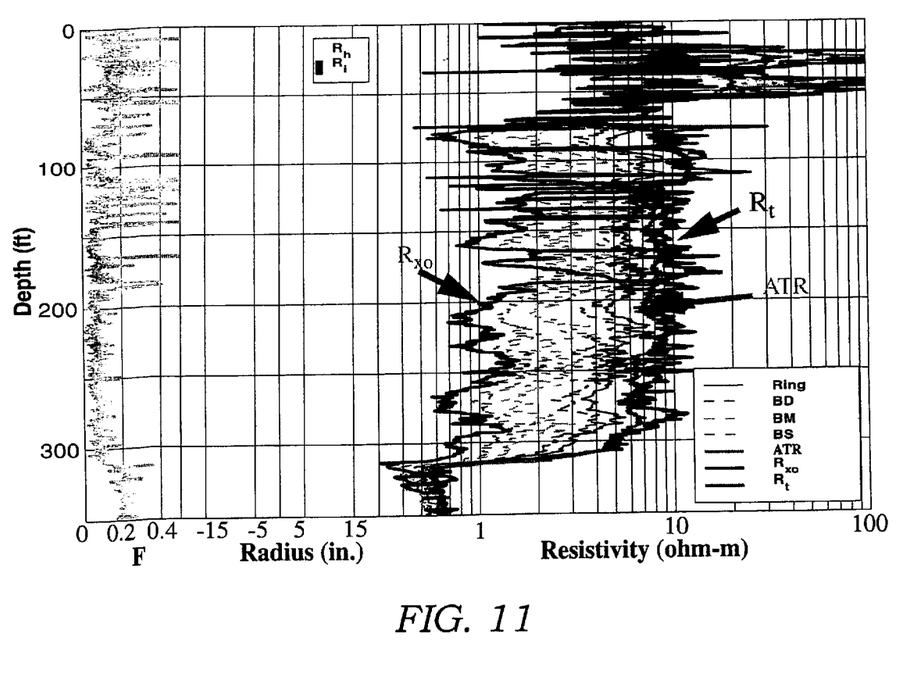
FIG. 11 graphically illustrates calculated borehole and formation characteristics obtained with application of the present invention for a case including field log inputs and a comparison against the attenuation resistivity of a Compensated Dual Resistivity Tool.

The equivalent circuit model of the invention has also been tested with actual field logs obtained with the well tool disclosed in Clark '036. FIG. 11 shows the results obtained for a gas well that was drilled with an 8.5 inch bit. The drilling and formation fluid is salt saturated. The log input and the $R_t$ and $R_{xo}$ from the circuit model are shown on the right track. The inverted hole radii $R_t$ and $R_h$ are shown in the middle track. Also plotted for comparison along with the tool log is the attenuation resistivity from the Compensated Dual Resistivity Tool (CDR), a mark of Schlumberger. The inverted $R_t$ is slightly higher than the CDR resistivity. With invasion less than 30 inches in diameter, the CDR attenuation resistivity (ATR) should read close to the true formation resistivity. Two factors, resolution and anisotropy, may contribute to the remaining differences between the laterolog tool $R_t$ and the CDR resistivity. Note also that the reconstruction of the log is almost perfect, as reflected by the small residual cost function shown in the left track, suggesting the $R_t$ from the circuit model inversion should be close to the true value.

Figure 12:
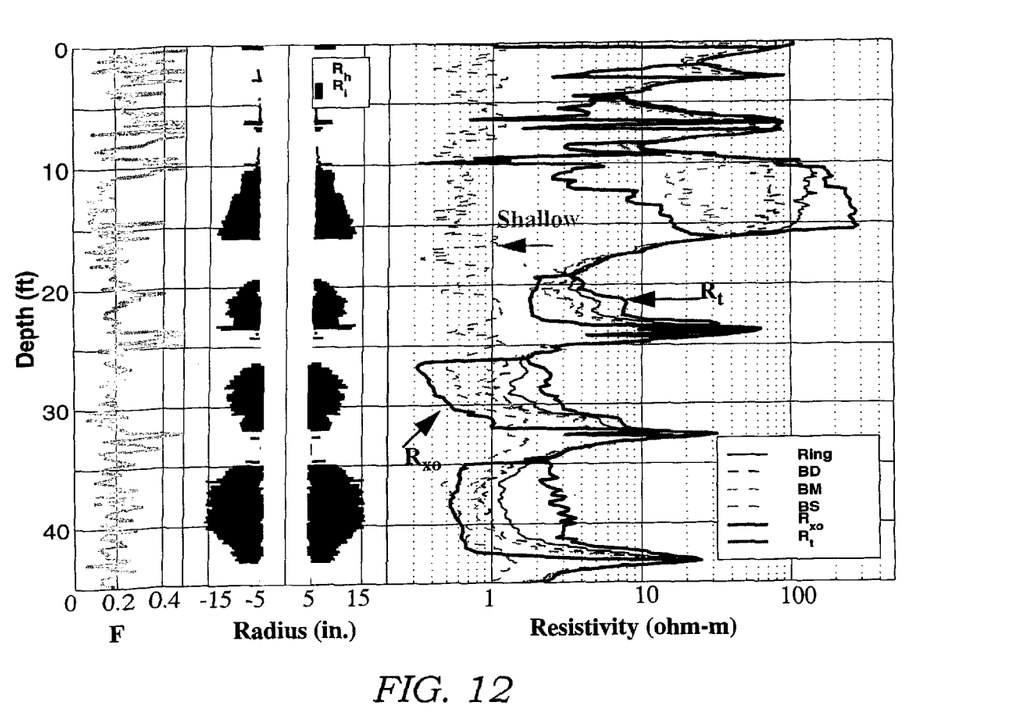
FIG. 12 graphically illustrates calculated borehole and formation characteristics obtained with application of the present invention for a case including field log inputs from a carbonate formation interval with salt saturated mud.

FIG. 12 shows another field log example from a carbonate interval drilled with salt saturated mud. The circuit-model inverted hole radius $R_h$ in the middle track indicates hole washout in the upper section, compared to the bit size of 8.5 inches. From 0 to 26 feet, the log shows the shallow button 18 reading less than 1 ohm-meter in response to the enlarged borehole in both the porous and tight zones. It is this response to the borehole that causes the shallow button to read less than $R_{xo}$. From 26 to 45 feet, the porous zones are seen to be in gauge and invaded out to 30 inches in diameter.

Figure 13:
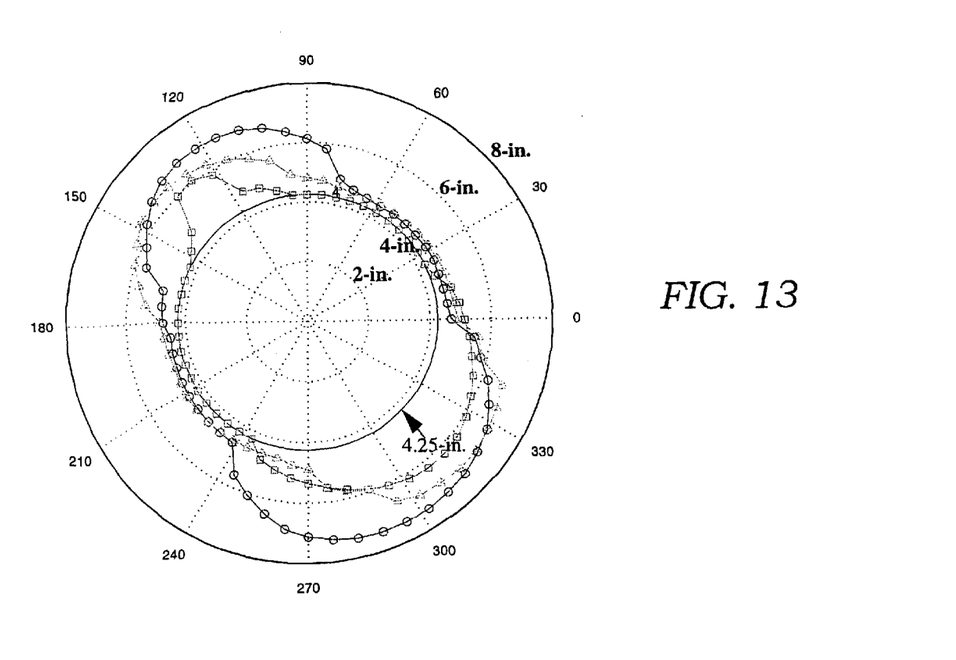
FIG. 13 is a schematic diagram of a borehole shape at three different well locations obtained with application of the present invention.

The equivalent circuit model may be applied to azimuthal measurements from well tools to produce an azimuthal borehole radius and invasion profile. This can be used to characterize borehole breakout. FIG. 13 shows the borehole shape at three different well locations obtained from the sensor resistivity measurements in each of 56 azimuthal bins of the Clark '036 tool. The shape is indicative of borehole breakout associated with geomechanical stresses. The breakout is seen to be as large as 3 inches deep. In the direction away from the breakout, the hole is either equal to or slightly larger than the bit size of 4.25 inches. A circular borehole with bit diameter of 4.25 inches is displayed for reference. The availability of this detailed borehole profile is useful for qualitative geomechanical studies.

Figure 14:
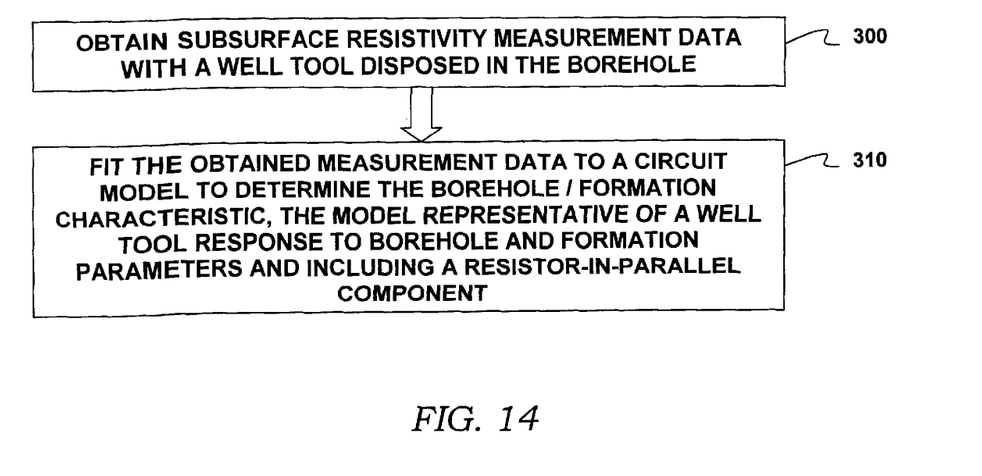
FIG. 14 is a flow chart of one example of a method for characterizing the response of a subsurface resistivity measurement to determine a characteristic of a borehole within the subsurface and/or a characteristic of a formation surrounding the borehole in accord with the invention.

FIG. 14 illustrates a flow diagram of a method for characterizing the response of a subsurface resistivity measurement to determine a characteristic of a borehole within the subsurface and/or a characteristic of a formation surrounding the borehole. The method includes obtaining subsurface resistivity measurement data with a well tool disposed within the borehole 300; and fitting the obtained resistivity measurement data to an electric circuit model to determine the borehole characteristic and/or the formation characteristic, the circuit model being representative of a response of the well tool to borehole and formation parameters, the model including at least one resistor-in-parallel component 310.

Figure 15:
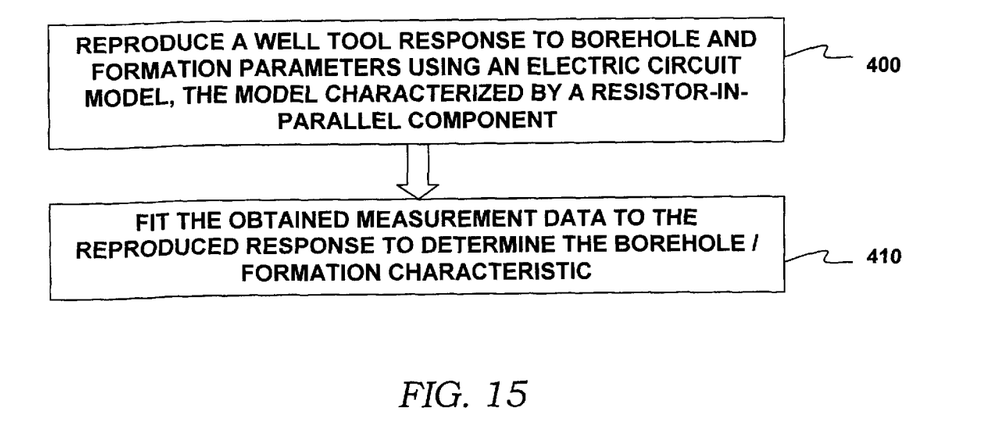
FIG. 15 is a flow chart of a method for determining a characteristic of a borehole traversing an earth formation and/or a characteristic of the formation surrounding the borehole using measurement data obtained from a well tool disposed within the borehole in accord with the invention.

FIG. 15 illustrates a method for determining a characteristic of a borehole traversing an earth formation and/or a characteristic of the formation surrounding the borehole using measurement data obtained from a well tool disposed within the borehole. The method includes reproducing a response of the well tool to borehole and formation parameters using an electric circuit model, the model being characterized by at least one resistor-in-parallel component 400; and fitting the obtained measurement data to the reproduced response to determine the borehole characteristic and/or the formation characteristic 410.

Program Storage Device: It will be apparent to those of ordinary skill having the benefit of this disclosure that the present invention may be implemented by programming one or more suitable general-purpose computers having appropriate hardware. The programming may be accomplished through the use of one or more program storage devices readable by the computer processor and encoding one or more programs of instructions executable by the computer for performing the operations described above. The program storage device may take the form of, e.g., one or more floppy disks, a CD ROM or other optical disk; a magnetic tape; a read-only memory chip (ROM); and other forms of the kind well-known in the art or subsequently developed. The program of instructions may be "object code," i.e., in binary form that is executable more-or-less directly by the computer; in "source code" that requires compilation or interpretation before execution; or in some intermediate form such as partially compiled code. The precise forms of the program storage device and of the encoding of instructions are immaterial here.

4.4 Borehole/Formation Characterization System

Figure 16:
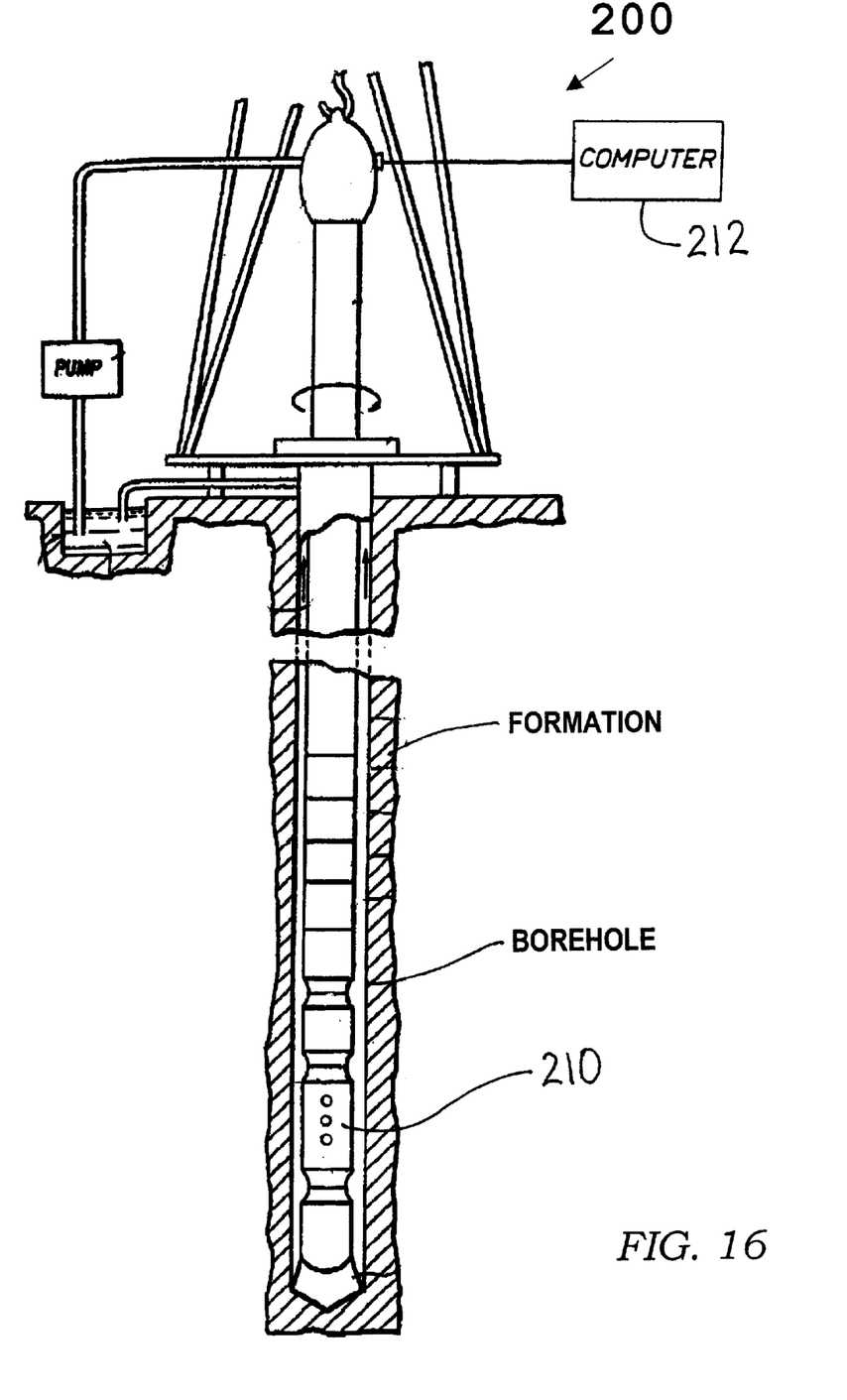
FIG. 16 shows a system for characterizing the response of a subsurface resistivity measurement and for determining a characteristic of a borehole traversing an earth formation and/or a characteristic of the formation surrounding the borehole in accord with the invention.

As shown in FIG. 16, the present invention may be implemented in a borehole/formation characterization system 200 with a multi-sensor well tool 210 and an apparatus (such as the general-purpose computer and program storage device described above) 212 coupled to the tool 210. Certain conventional details are omitted in FIG. 16 for clarity of illustration. It will be appreciated by those skilled in the art that the present invention may be implemented in LWD or wireline operations with any tool 210 capable of obtaining focused azimuthal resistivity measurements.

The borehole and/or formation characteristics can be determined in real time by sending the measured signal data from the tool 210 to the surface as they are acquired via a telemetry system, or from a recorded mode by recording the signal data on a suitable storage medium (not shown) included in the tool 210 circuitry as known in the art. Alternatively, some or all processing may be performed downhole with the results being sent to the surface. The signal data may be sent to the surface computer 212 by MWD telemetry as known in the art. It will be understood that alternative means may be employed for communicating the is acquired data to the surface, as the precise form of communication is immaterial to the implementation of the present invention.

The surface computer 212 may be programmed to receive the input measurement data. It may also be programmed for generating and/or storing the circuit model parameter data, computing theoretical responses corresponding to varying borehole diameters and formation and borehole fluid resistivities. For a laterolog measurement at low frequency, the borehole size and the resistivity contrast between formation and mud resistivity control the deviation of the apparent resistivity of the measurement from the true formation resistivity. A resistivity transform can also be applied, if necessary, to remove the effect of skin depth on the apparent resistivity.

As known in the art, the response data can be modeled or computed for a particular tool embodiment by using any suitable algorithm (e.g., finite element model coding) to calculate the theoretical current flow for the sensors and converting the data to resistivity values. The circuit parameter data may be generated and/or stored in the computer 212 before or after the tool is disposed in the borehole. The computer 212 may also be programmed to process the measurement data, the mud resistivity $R_m$ and the modeled data to determine the borehole caliper $D_h$, the formation resistivity $R_t$, the invasion diameter $D_i$, and the invaded zone resistivity $R_{xo}$ in accordance with the disclosed techniques. Once determined, the borehole and formation characteristics can be recorded on a suitable storage medium or further processed as desired by the user to generate a borehole and/or formation profile.

The disclosed equivalent circuit model has shown to be accurate, providing a simplified approach to reproduce the response of subsurface electromagnetic measurements to borehole mud and mud filtrate invasion. The new geometrical factors associated with the weight of the contributions of different physical regions are purely geometrical, a clear advantage over traditional borehole and formation definition. The model accounts for borehole and invasion effects simultaneously. This feature eliminates the need for borehole correction prior to inversion, which is difficult to implement because of the absence of a mechanical caliper while drilling and theoretically incomplete for laterolog tools. The model also solves for the borehole diameter automatically, leading to more accurate $R_t$ values in overage and oval boreholes.

While the methods and systems of the invention have been described as specific embodiments, it will be apparent to those skilled in the art that variations may be applied to the structures and in the steps or in the sequence of steps of the methods described herein without departing from the concept and scope of the invention. All such similar variations apparent to those skilled in the art are deemed to be within this concept and scope of the invention as defined by the appended claims.

What is claimed is:

1. A method for characterizing the response of a subsurface resistivity measurement to determine a characteristic of a borehole within the subsurface and/or a characteristic of a formation surrounding the borehole, comprising:
    a) obtaining subsurface resistivity measurement data with a well tool disposed within the borehole; and
    b) fitting the obtained resistivity measurement data to an electric circuit model to determine the borehole characteristic and/or the formation characteristic, the circuit model being representative of a response of the well tool to borehole and formation parameters, the model including at least one resistor-in-parallel component.

2. The method of claim 1, wherein the method is performed during or after drilling of the borehole.

3. The method of claim 1, wherein the subsurface resistivity measurement data represents multi-sensor or multi-channel azimuthal resistivity measurement data.

4. The method of claim 1, wherein step (b) comprises performing a least squares minimization technique to fit the obtained measurement data to the circuit model.

5. The method of claim 1, wherein the well tool is a laterolog tool.

6. The method of claim 1, wherein the characteristic of the borehole comprises a borehole fluid resistivity or a parameter characterizing the geometry of the borehole.

7. The method of claim 1, wherein the characteristic of the formation comprises one of an invasion geometry parameter, invaded zone resistivity, or a formation resistivity.

8. The method of claim 1, wherein a finite-element modeling technique is used to derive parameters for the electric circuit model.

9. The method of claim 1, wherein at least one parameter of the electric circuit model is independent of the resistivity characteristics of the formation.

10. The method of claim 1, wherein the electric circuit model comprises a first segment including at least one resistor in series with the at least one resistor-in-parallel component.

11. The method of claim 10, the electric circuit model further comprising a second segment including at least one resistor in parallel with the first segment.

12. The method of claim 1, wherein the electric circuit model is represented by the following expression:

$$\frac{1}{R_a} = \frac{J^P}{R_m} + \frac{(1-J^P)}{J^S R_m + (1-J^S)R_{\mathit{eff}}},$$

where $R_a$ is measurement resistivity data;

$R_m$ is a borehole fluid resistivity;

$$\frac{1}{R_{\mathit{eff}}} = \frac{J_1^P}{R_{xo}} + \frac{(1-J_1^P)}{J_1^S R_{xo} + (1-J_1^S)R_t}; \text{ and}$$

$R_{xo}$ is an invaded zone resistivity and $R_t$ is a true formation resistivity.

13. A method for determining a characteristic of a borehole traversing an earth formation and/or a characteristic of the formation surrounding the borehole using measurement data obtained from a well tool disposed within the borehole, comprising:
    a) reproducing a response of the well tool to borehole and formation parameters using an electric circuit model, the model being characterized by at least one resistor-in-parallel component; and
    b) fitting the obtained measurement data to the reproduced response to determine the borehole characteristic and/or the formation characteristic.

14. The method of claim 13, wherein the method is performed during or after drilling of the borehole.

15. The method of claim 13, wherein the measurement data represents multi-sensor or multi-channel azimuthal resistivity measurements.

16. The method of claim 13, wherein step (b) comprises performing a least squares minimization technique to fit the obtained measurement data to the reproduced response.

17. The method of claim 13, wherein the well tool is a laterolog tool.

18. The method of claim 13, wherein the characteristic of the borehole comprises a borehole fluid resistivity or a parameter characterizing the geometry of the borehole.

19. The method of claim 13, wherein the characteristic of the formation comprises one of an invasion geometry parameter, invaded zone resistivity, or a formation resistivity.

20. The method of claim 13, wherein step (a) comprises using a finite-element modeling technique to derive parameters for the electric circuit model.

21. The method of claim 13, wherein at least one parameter of the electric circuit model is independent of the resistivity characteristics of the formation.

22. The method of claim 13, wherein the electric circuit model comprises a first segment including at least one resistor in series with the at least one resistor-in-parallel component.

23. The method of claim 22, wherein the electric circuit model further comprising a second segment including at least one resistor in parallel with the first segment.

24. The method of claim 13, wherein the electric circuit model is represented by the following expression:

$$\frac{1}{R_a} = \frac{J^P}{R_m} + \frac{(1-J^P)}{J^S R_m + (1-J^S) R_{\mathit{eff}}},$$

where $R_a$ is measurement resistivity data;
$R_m$ is a borehole fluid resistivity;

$$\frac{1}{R_{\mathit{eff}}} = \frac{J_1^P}{R_{xo}} + \frac{(1-J_1^P)}{J_1^S R_{xo} + (1-J_1^S) R_t}; \text{ and}$$

$R_{xo}$ is an invaded zone resistivity and $R_t$ is a true formation resistivity.

25. A system for characterizing the response of a subsurface resistivity measurement to determine a characteristic of a borehole within the subsurface and/or a characteristic of a formation surrounding the borehole, the system including a well tool and an apparatus adapted to be coupled to the well tool, the tool being adapted to transmit and receive electromagnetic energy when disposed in the borehole, the apparatus being adapted to respond to measurement data generated by the tool and associated with the electromagnetic energy, the apparatus comprising:

means for receiving the measurement data;
means for storing model parameters representative of a response of the well tool to borehole and formation properties, the model being characterized by an electric circuit having at least one resistor-in-parallel component; and
means for comparing the received measurement data to the stored model parameters to determine the borehole characteristic and/or the formation characteristic.

26. The system of claim 25, wherein the characteristic of the borehole comprises a borehole fluid resistivity or a parameter characterizing the geometry of the borehole.

27. The system of claim 25, wherein the characteristic of the formation comprises one of an invasion geometry parameter, invaded zone resistivity, or a formation resistivity.

28. The system of claim 25, the means for comparing the received measurement data comprising means for performing a least squares minimization technique to fit the received measurement data to the stored model parameters.

29. The system of claim 25, wherein the electric circuit model comprises a first segment including at least one resistor in series with the at least one resistor-in-parallel component.

30. The system of claim 29, the electric circuit model further comprising a second segment including at least one resistor in parallel with the first segment.

31. The system of claim 25, wherein the electric circuit model is represented by the following expression:

$$\frac{1}{R_a} = \frac{J^P}{R_m} + \frac{(1-J^P)}{J^S R_m + (1-J^S) R_{\mathit{eff}}},$$

where $R_a$ is measurement resistivity data;
$R_m$ is a borehole fluid resistivity;

$$\frac{1}{R_{\mathit{eff}}} = \frac{J_1^P}{R_{xo}} + \frac{(1-J_1^P)}{J_1^S R_{xo} + (1-J_1^S) R_t}; \text{ and}$$

$R_{xo}$ is an invaded zone resistivity and $R_t$ a true formation resistivity.

32. A system for determining a characteristic of a borehole traversing an earth formation and/or a characteristic of the formation surrounding the borehole, the system including a well tool and an apparatus adapted to be coupled to the well tool, the tool being adapted to transmit and receive electromagnetic energy through the borehole and the formation when disposed in the borehole, the apparatus being adapted to respond to measurement data generated by the tool and associated with the electromagnetic energy, the apparatus comprising:

means for receiving the measurement data;
means for storing model parameters representative of a response of the well tool to borehole and formation properties, the model being characterized by an electric circuit having at least one resistor-in-parallel component; and
means for comparing the received measurement data to the stored model parameters to determine the borehole characteristic and/or the formation characteristic.

33. The system of claim 32, wherein the characteristic of the borehole comprises a borehole fluid resistivity or a parameter characterizing the geometry of the borehole.

34. The system of claim 32, wherein the characteristic of the formation comprises one of an invasion geometry parameter, invaded zone resistivity, or a formation resistivity.

35. The system of claim 32, the means for comparing the received measurement data comprising means for performing a least squares minimization technique to fit the received measurement data to the stored model parameters.

36. The system of claim 32, wherein the electric circuit model comprises a first segment including at least one resistor in series with the at least one resistor-in-parallel component.

37. The system of claim 36, the electric circuit model further comprising a second segment including at least one resistor in parallel with the first segment.

38. The system of claim 32, wherein the electric circuit model is represented by the following expression:

$$\frac{1}{R_a} = \frac{J^P}{R_m} + \frac{(1-J^P)}{J^S R_m + (1-J^S) R_{\mathit{eff}}},$$

where $R_a$ is measurement resistivity data;
$R_m$ is a borehole fluid resistivity;

$$\frac{1}{R_{\mathit{eff}}} = \frac{J_1^P}{R_{xo}} + \frac{(1-J_1^P)}{J_1^S R_{xo} + (1-J_1^S) R_t}; \text{ and}$$

$R_{xo}$ is an invaded zone resistivity and $R_t$ a true formation resistivity.

* * * * *